April 15, 1941.    E. LINDGREN    2,238,226
INTERLOCKING BOLT
Filed March 3, 1939
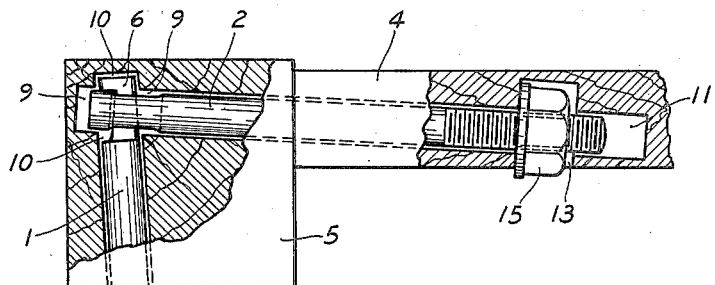
FIG. 1
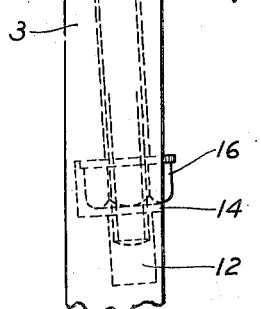
FIG. 2  FIG. 3  FIG. 4
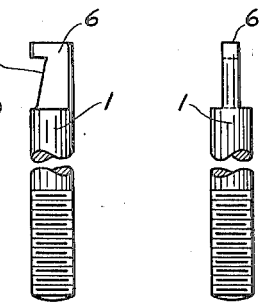
FIG. 5
FIG. 8  FIG. 6  FIG. 7
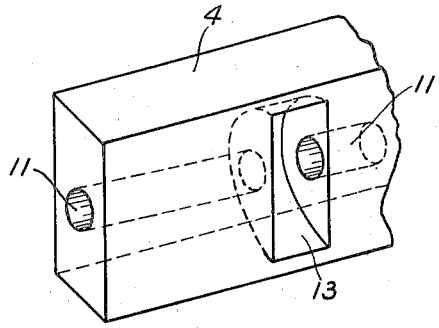
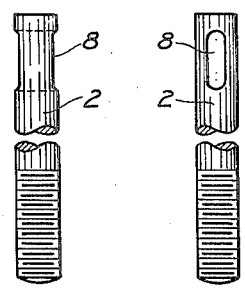
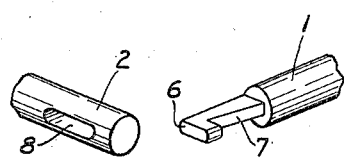
FIG. 9   FIG. 10
INVENTOR:
ELLIS LINDGREN
BY
ATTORNEY.

Patented Apr. 15, 1941

2,238,226

UNITED STATES PATENT OFFICE 2,238,226

INTERLOCKING BOLT

Ellis Lindgren, Geneva, Ill.

Application March 3, 1939, Serial No. 259,525

3 Claims. (Cl. 20—92)

My invention relates in general to interlocking bolts and more specifically to an arrangement of bolts which is especially useful in rigidly securing a pair of side arms or part of a frame to a corner post. It is well recognized among furniture manufacturers that the methods now used for securing the side boards of a table, chair, bench or the like to the corner post thereof, are not entirely satisfactory, and that these pieces quite often come apart or are worked loose. The most universal method now employed is the use of dowell pins and glue.

My invention as hereinafter described provides a highly satisfactory arrangement of interlocking bolts which when properly applied to the sides and corner posts of a chair, table, bed, bench or the like, firmly locks the parts together and yet is easily removed to disassemble the parts.

While I have chosen to illustrate my invention by one embodiment thereof it should be understood that there are a number of variations which may be made in the structure shown without departing from the spirit of my invention and also that the invention is readily adapted for use with many devices other than that shown in the drawing.

Having briefly described the general features of the invention I will now describe the same in detail by reference to the accompanying drawing.

Fig. 1 is a top view partly in section of a corner post and side arms of a piece of furniture held together by the bolts designed in accordance with my invention.

Fig. 2 is an end view of one of the bolts.

Fig. 3 is a front view of the bolt shown in Fig. 2.

Fig. 4 is a side view of the bolt of Figs. 2 and 3, taken from the right of Fig. 3.

Fig. 5 is an end view of the other bolt.

Fig. 6 is a front view of the bolt of Fig. 5.

Fig. 7 is a side view taken from the right of Fig. 6.

Fig. 8 is a perspective view of one of the side arms shown in Fig. 1, showing the manner of drilling the same.

Figs. 9 and 10 are perspective views of the heads of the two bolts showing more clearly the manner of interlocking.

With reference to Fig. 1, I have shown a pair of metal bolts 1 and 2 used to secure the two side boards 3 and 4 of a table or chair to the corner post 5. The corner post 5 has been cut away to show how the bolts interlock inside the post, and the side board 4 has also been cut away to more clearly show the nut and washer and the holes in which the bolt and nut fit. The bolt 1 is shown in detail in Figs. 2, 3 and 4 and has its end milled down on two sides to form a flat projecting end 6 having a hook formed thereon by having a groove milled in the third side at 7. This groove 7 has a somewhat inclined bottom surface as shown clearly in Fig. 3. The bolt 1 has been broken in the middle in Figs. 3 and 4 to conserve space and is shown threaded on the end opposite the grooved or hook end.

The other one of the bolts is shown in Figs. 5, 6, 7 and 9 and has a slot cut through one end thereof at 8 and is also threaded on the opposite end. The slot 8 is of a size to accommodate the flat end 6 of the bolt 1 so that it may be inserted therethrough.

In utilizing these bolts to secure two side boards to a corner post without having any flaw appear in the outside of any part, the parts are prepared as follows. The corner post 5 has two intersecting holes 9 and 10 bored therein (as shown in Fig. 1), each hole extending slightly beyond the intersection with the other hole. In the adaptation used I have shown these holes each drilled at a slight angle as well as the holes in the side boards 3 and 4, but it should be understood that these holes may be drilled straight if desired and the groove in the end 6 of bolt 1 may be straight instead of at the angle shown. The two side boards 3 and 4 are also drilled as shown with holes 11 and 12 somewhat longer than the bolts 1 and 2 and a groove or notch is then cut out of each side board at 13 and 14 somewhat deeper and wider than the nuts 15 and 16 so that these nuts may be threaded over the ends of bolts 1 and 2 and turn freely in the notches.

In assembling the parts the bolt 2 is first inserted in the hole 9 of corner post 5 and the bolt 1 is then inserted in hole 10 of the post through the hole or slot 8 in the bolt 2. After the part 6 of bolt 1 has passed through the slot 8 the board 4 is pushed over the end of bolt 2 and the nut 15 applied thereto and tightened. As the nut 15 is tightened the end of slot 8 will be drawn down into the groove as shown in Fig. 1 and the two bolts are effectually interlocked. The side board 3 may then be placed over bolt 1 and the nut 16 applied thereto and both nuts may now be tightened to clamp the side boards tightly to the corner post. It will be seen that as the nuts are tightened the end of bolt 1 on each side of bolt 2 acts as a pair of shoulders on bolt 2 and is pressed tightly against the side of hole 10 and the end of bolt 2 on either side of bolt 1 is pressed tightly against the side of hole 9 so that in effect each of the bolts 1 and 2 have a T-shaped end which securely locks them in the post 5 and provides ample purchase against which the nuts can be tightly drawn.

In dismantling the parts it is of course only necessary to loosen the nuts to the extent that bolt 2 may be pushed down to the end of hole 9 far enough so that the slot 8 in bolt 2 clears the hook 6 on the end of bolt 1 and the bolts may then be easily withdrawn. The length of bolts 1 and 2 is of course immaterial. It is only necessary to provide the tongue and groove or slot arrangement with the hooked end on bolt 1 which prevents withdrawal of the bolt 1 after the bolt 2 has been drawn up so that the end of slot 8 enters groove 7 to prevent withdrawal of either bolt.

Having fully described the various features and aspects of my invention, what I consider to be new and desire to have protected by Letters Patent will be pointed out in the appended claims.

What is claimed is:

1. A securing means for fastening two side arms of an article of furniture to a corner post thereof, each side arm having a hole bored lengthwise therein and the corner post having a pair of intersecting holes bored only part way therethrough and registering with the holes in said side arms, a pair of bolts each inserted into the hole of a side arm and one of said intersecting holes, one bolt having an eye in the end inserted in the corner post hole and the other having a hook inserted into the eye of the other bolt through the other post hole, nuts threaded onto the other ends of said bolts, said nuts when tightened clamping the post and arms together and inter-locking the bolts to prevent withdrawal of the hook from the eye, the loosening of one of said nuts unlocking the hook from the eye and permitting withdrawal thereof and dismantling of the parts solely by the loosening thereof.

2. In an article of furniture having a corner post with a pair of intersecting holes bored from adjacent sides thereof only part way through the post and a pair of side arms with holes registering with the holes in the corner post, securing means for fastening said side arms to the corner post comprising a bolt extending through the hole in one side arm and into one of the holes in said post and having an opening registering with the other intersecting hole, another bolt extending through the hole in the other side arm and into the other hole in the post and having a hooked end passing loosely through the opening in the first bolt, and nuts on each bolt for tightening them to cause the hook and opening to interlock to prevent withdrawal of the hook from the slot and rigidly secure the arms and post, said hooked end readily removable to dismantle the parts when the nuts are loosened.

3. A securing means for fastening the two side arms of a corner joint together, each side arm having a hole bored lengthwise therein so that no openings appear on the outside of the joint when the arms are in place, a pair of interlocking bolts each inserted into the hole of a side arm and having a nut on the end opposite the joint, one bolt having an eye in the joint end thereof registering with the hole in the other side arm, the other bolt having a hooked end passing loosely through the eye in the end of the other bolt when the arms are joined, said nuts when tightened causing the interlocking of the hooked end with the edge of the eye in the other bolt and the clamping of the two side arms rigidly together, the loosening of one of said nuts unlocking the hook from the eye and permitting withdrawal of the hooked end from the hole in the other bolt, and consequent dismantling of the two side arms, solely by the loosening thereof.

ELLIS LINDGREN.